US006803089B2

(12) United States Patent
Chou

(10) Patent No.: US 6,803,089 B2
(45) Date of Patent: Oct. 12, 2004

(54) CLEANING SUBSTRATE FOR CLEANING AND REGENERATING A MOLD

(75) Inventor: Kuang Chun Chou, Kaohsiung (TW)

(73) Assignee: Advanced Semiconductor Engineering Inc. (TW)

( * ) Notice: Subject to any disclaimer, the term of this patent is extended or adjusted under 35 U.S.C. 154(b) by 172 days.

(21) Appl. No.: 09/928,991

(22) Filed: Aug. 15, 2001

(65) Prior Publication Data

US 2003/0034049 A1 Feb. 20, 2003

(51) Int. Cl.⁷ .............................. B32B 3/00; B29C 33/00
(52) U.S. Cl. .................... 428/153; 428/172; 428/537.5; 249/187.1
(58) Field of Search ............................... 428/153, 156, 428/167, 537.5, 172; 15/118; 249/83, 187.1

(56) References Cited

U.S. PATENT DOCUMENTS

| | | | | |
|---|---|---|---|---|
| 3,130,412 A | * | 4/1964 | Fox et al. | 428/153 |
| 3,575,764 A | * | 4/1971 | McFarren | 156/306.6 |
| 4,935,175 A | * | 6/1990 | Kitaura et al. | 264/39 |
| 5,366,785 A | * | 11/1994 | Sawdai | 428/156 |
| 5,443,889 A | * | 8/1995 | Ruppel et al. | 428/172 |
| 6,077,360 A | | 6/2000 | Takashima | |

* cited by examiner

*Primary Examiner*—Donald J. Loney

(57) ABSTRACT

A cleaning substrate for cleaning and regenerating a mold is disclosed. The mold is contaminated after repeatedly packaging the semiconductor device by making use of thermosetting resin. At least a protrusion of the substrate can substantially match with and be contained within the edges of the mold cavity of the mold when the cleaning substrate is placed in the mold.

3 Claims, 5 Drawing Sheets

US 6,803,089 B2

CLEANING SUBSTRATE FOR CLEANING AND REGENERATING A MOLD

FIELD OF THE INVENTION

The invention relates to a cleaning substrate for cleaning and regenerating a mold, and more particularly, to a cleaning substrate for cleaning a mold of a semiconductor package that can save the amount of the usage of the cleaning compound without changing the facilities of the original fabrication process.

BACKGROUND OF THE INVENTION

During the encapsulating process by making use of the mold for molding the encapsulant of thermosetting resin, the mold releasing agent contained in the encapsulant of thermosetting resin can seep into the inner surface of the mold in order to release the mold. However, the mold-releasing characteristic of the molding parts will be deteriorated and the molding parts will be damaged cosmetically resulting from the continuously repeating the encapsulating process. Consequently, the material layer is contaminated and the mold releasing agent become less effective.

To resolve the above-mentioned problems, cleaning work must be undertaken to remove the contaminated material layer that makes the mold-releasing agent ineffective. For example, an encapsulant made of thermosetting melamine resin is put in the mold so as to make the contaminated material, which is positioned on the inner surface of the mold, integrally form and solidify in order to be removed, thereby, the inner surface of the mold is cleaned.

FIG. 1 and FIG. 2 disclose a conventional semiconductor mold. As shown in FIG. 1 and FIG. 2, the semiconductor mold 10 has a pot 11 for storing encapsulant. The pot 11 is connected to a mold cavity 14 through a runner 12 and a gate 13 where the mold cavity 14 is employed for placing semiconductor chip (not shown). When packaging a semiconductor chip, a plunger 15 is employed to press downward so as to compress the encapsulant that is liquidized to flow through the runner 12 and the gate 13, and then fill the mold cavity 14 so as to encapsulate the semiconductor chip. Thereafter, the mold 10 is opened and the molded products are taken out after the encapsulant material is hardened.

However, after the above-mentioned steps are continuously performed, a contaminated material layer is generated on the inner surface of the mold 10. Especially, the contaminated material layer on the inner surface of the mold cavity 14 will cosmetically damage the molded products. Therefore, it is necessary to clean the contaminated material layer of the mold 10. As shown in FIG. 2, when cleaning the mold 10, a cleaning substrate 20 is put into the mold 10, and a cleaning compound is injected into the mold cavity 14. As the cleaning compound is solidified, it will integrally form with the contaminated material layer on the inner surface of the mold cavity 14 and the cleaning substrate to become a plastic mold which is then taken out of the mold cavity 14. The inner surface of the mold will be entirely cleaned after repeating the above-mentioned action for around 10 to 15 times.

It is noted that the cleaning substrate 20 is generally designed in the shape of a plate that can not effectively reduce the volume of the mold cavity 14 such that it takes several times for mold injecting to fill the mold cavity 14 of the mold 10. As a result, it unnecessarily wastes the material of the cleaning compound.

In the light of the above-mentioned disadvantages, it is necessary to provide a cleaning substrate for cleaning the mold of the semiconductor package that can save the amount of the usage of the cleaning compound without changing the facilities of the original fabrication process.

SUMMARY OF THE INVENTION

It is an object of the present invention to provide a cleaning substrate for cleaning the mold of the semiconductor package that can save the amount of the usage of the cleaning compound.

To achieve the above object, the present invention provides a cleaning substrate for cleaning and regenerating a mold. A protrusion provided on the substrate can substantially match with and be contained within the edges of a mold cavity of the mold when the cleaning substrate is placed in the mold while the mold is contaminated after repeatedly packaging the semiconductor device.

In another aspect of the cleaning substrate according to the present invention, the profile of the protrusion is corresponding to the edges of the mold cavity.

In one other aspect of the cleaning substrate according to the present invention, the cleaning substrate is made of paper.

In addition, a cleaning method provided by the present invention for cleaning a mold includes the following steps:

(a) providing a mold having at least a mold cavity;

(b) placing a cleaning substrate in the mold cavity wherein the cleaning substrate has at least a first protrusion that can substantially match and be contained within the edges of the mold cavity;

(c) injecting a cleaning compound into the mold cavity of the mold;

(d) hardening the cleaning compound such that the cleaning compound is integrally formed with the cleaning substrate to become a molding product; and (e) taking the molding product out of the mold cavity by opening the mold.

According to the cleaning substrate of the present invention for cleaning semiconductor package, when cleaning the mold, a cleaning substrate is put into the mold. The multiplicity of protrusions of the cleaning substrate can be substantially contained within the edges of the multiplicity of mold cavities of the mold. Then, a cleaning compound is injected into the mold cavity. The cleaning substrate can reduce the amount of usage for mold injection since the protrusions are provided on the cleaning substrate to reduce the volume of the cavity.

DETAILED DESCRIPTION OF THE EMBODIMENTS

Currently, manufacturers in the field of semiconductor generally make use of the conventional transfer molding to form an encapsulating member for packaging the chip and the substrate. Normally, a molding apparatus connecting to the mold cavity through a runner and a gate includes a pot for placing the encapsulant. Besides, the molding apparatus provides a plurality of eject pins for ejecting the molding products out of the mold cavity.

As for the molding process, firstly, the substrate with semiconductor chips attached thereon is placed into the molding apparatus. Then, the encapsulant is put in the pot with mold tightly clamped. Subsequently, a plunger in the pot is pushed to compress the encapsulant to flow through the runner and the gate so as to fill the mold cavity and encapsulate the chips and the substrate. After the encapsulant is entirely filled up the cavity, the plunger is kept still for a predetermined period of time till the encapsulant become hardened. Afterwards, the plunger is pulled up, the mold is opened, a degating process is performed, and the molding product is ejected by the use of the eject pin. However, after continuously repeating the above-mentioned processes, a contaminated material layer is generated on the inner surface of the mold.

Figure 1:
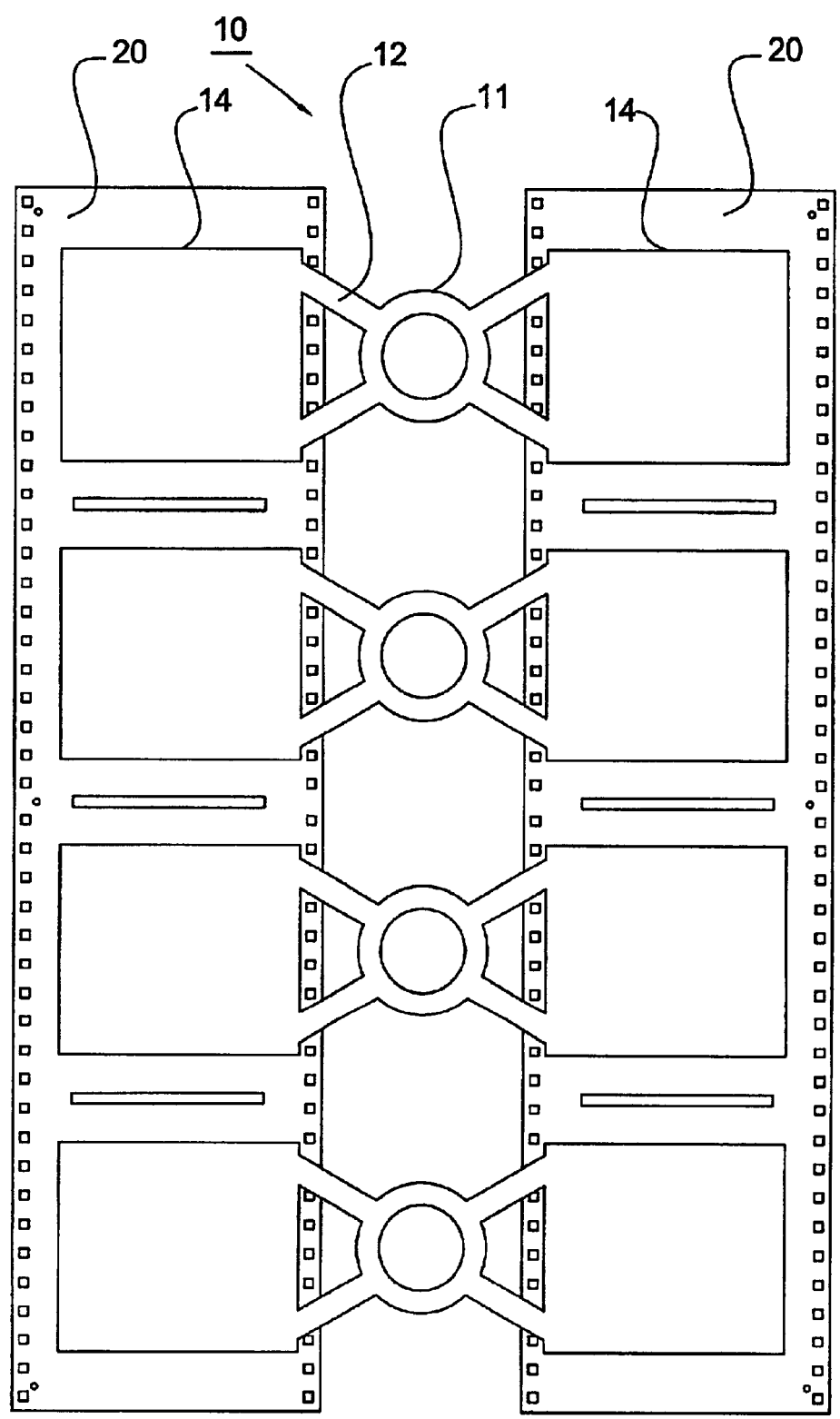
FIG. 1 is a top view of a conventional cleaning substrate for a mold.
Figure 2:
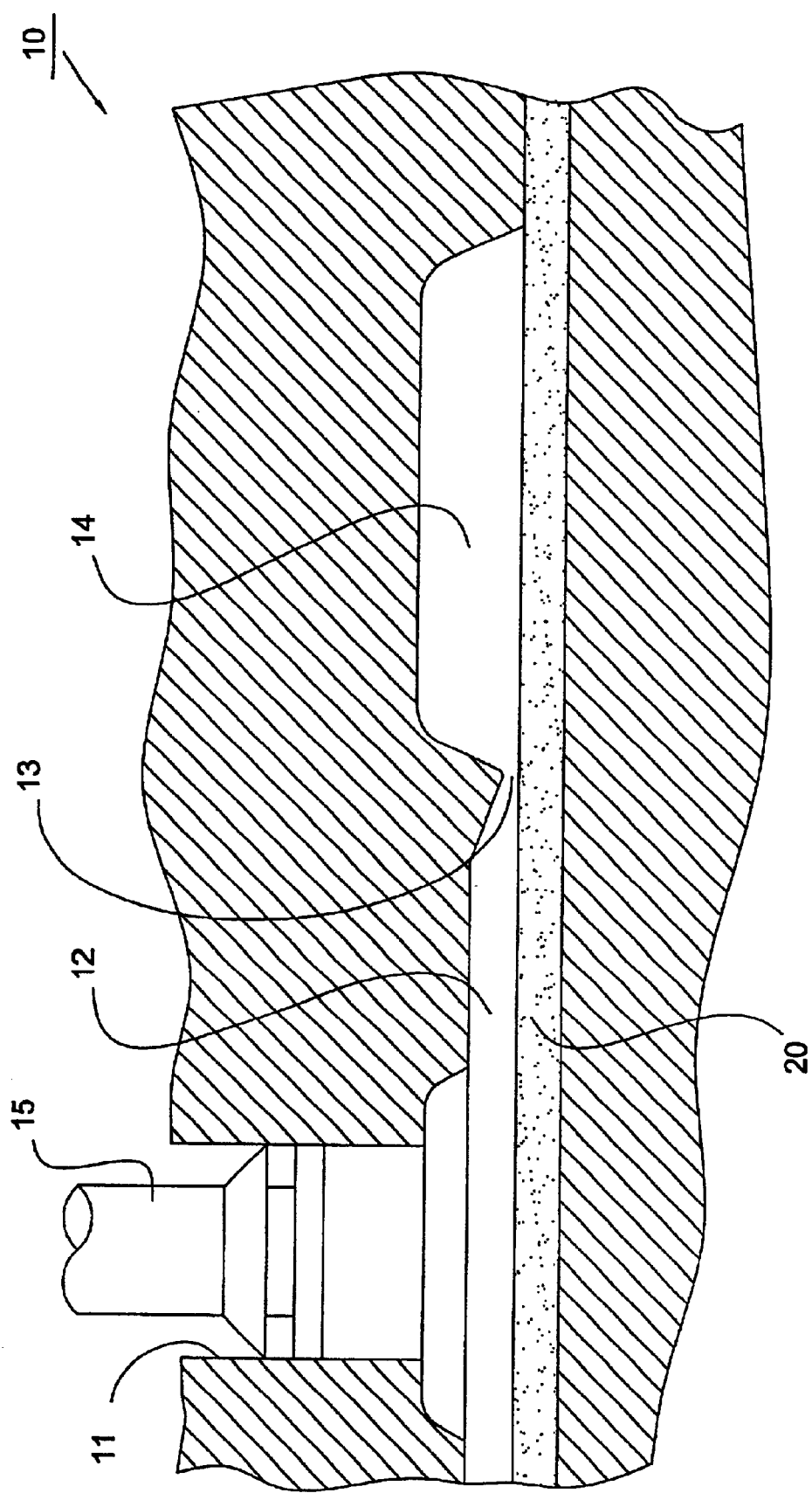
FIG. 2 is a partial cross-sectional view of a conventional cleaning substrate for a mold of FIG. 1.
Figure 3:
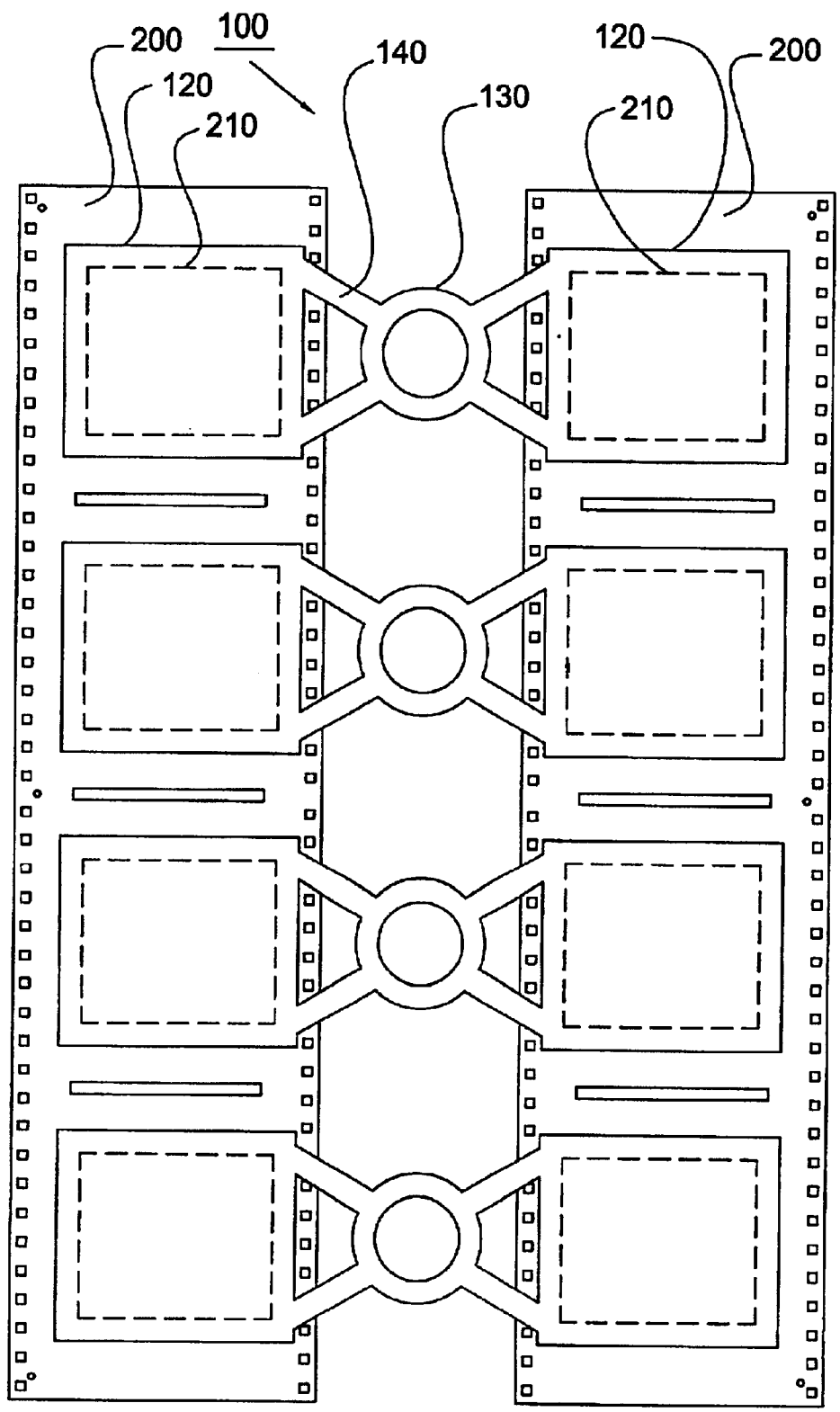
FIG. 3 is a top view of the cleaning substrate for a mold according to the preferred embodiment of the present invention.
Figure 4:
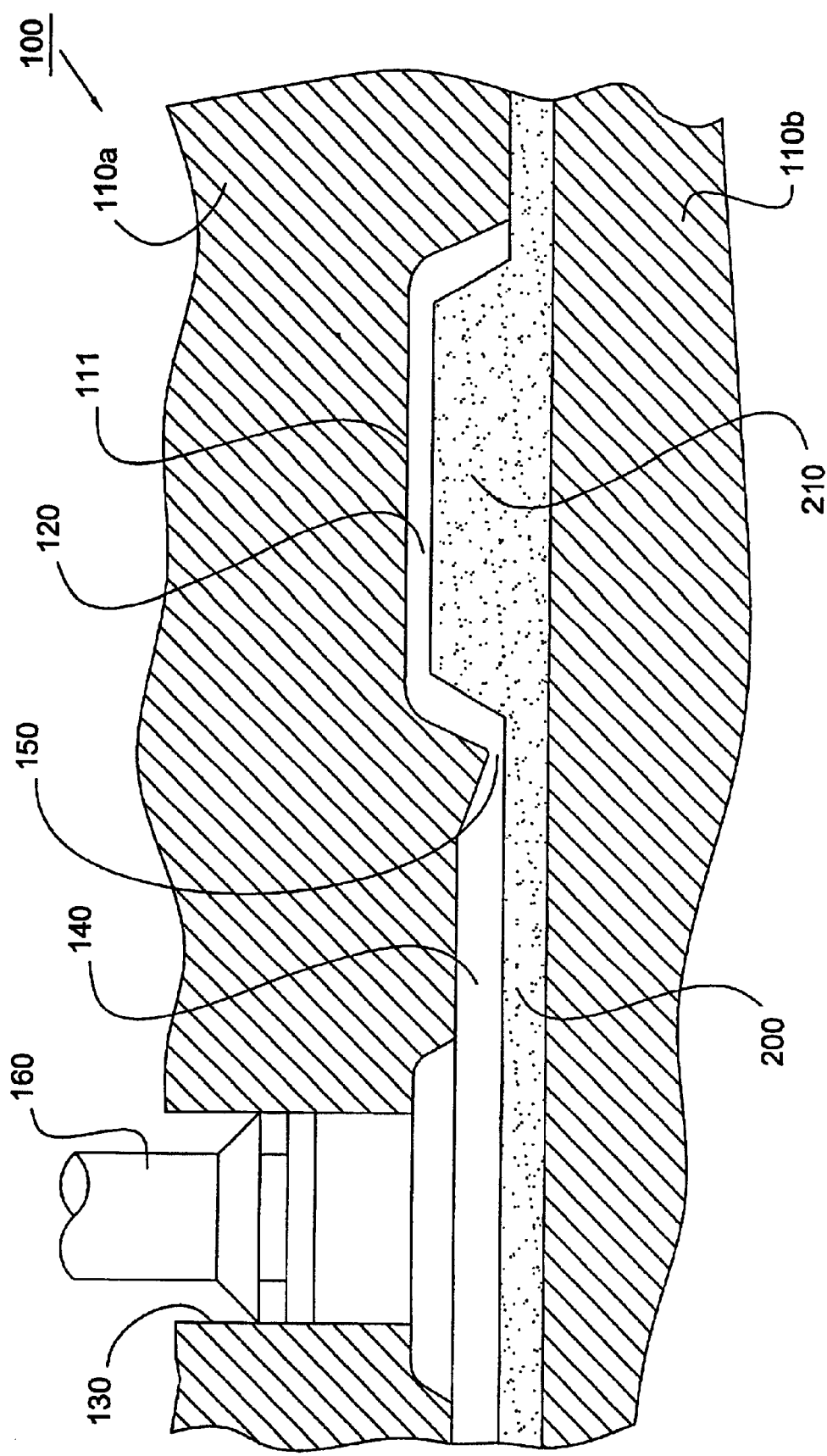
FIG. 4 is a partial cross-sectional view of a cleaning substrate for a mold according to the preferred embodiment of the present invention of FIG. 3.

FIG. 3 and FIG. 4 show a cleaning substrate for a semiconductor mold 100 according to the preferred embodiment of the present invention. As shown in FIG. 3, and FIG. 4, the semiconductor mold 100 is applicable for making semiconductor devices having printed circuit board (PCB) such as ball grid array (BGA). The mold 100 includes an upper mold 110a having a plurality of recesses 111 and a lower mold 110b. When the upper mold 110a and the lower mold 110b are closed, a mold cavity 120 is formed therebetween at the recesses 111. In addition, the mold 100 has a plurality of pots 130, a plurality of runners 140, and a plurality of gates 150 where the pots are connected to the mold cavities 120 through the runners 140 and gates 150.

As shown in FIG. 4, when cleaning the mold 100, the mold 100 is tightly clamped to have the cleaning substrate 200 containing in the mold cavities 120. A plurality of first protrusions 210, preferably made of paper, are provided on the top surface of the cleaning substrate 200 and are integrally formed thereof. Each of the protrusions 210 is entirely contained within the edges of the mold cavities 120 of the mold 100 respectively. Moreover, the profile of each the protrusion 210 is preferably corresponding to the edge of each recess 111 of the mold cavity 120 respectively. Then, a cleaning compound, such as a thermosetting melamine resin, stored in the pots 130 and compressed by a downward pushing plunger 160 flows through the runner 140 and gate 150, fills the mold cavities, and also forms over the top surface of the cleaning substrate 200. After the cleaning compound is hardened to have the cleaning compound, the contaminated material layer and the cleaning substrate 200 all integrally formed together to become a molding product, the mold 100 is opened to have the molding products taken out. In this way, the contaminated material layer is removed from the inner surface of the mold cavity 120. Since the substrate 200 is provided with the protrusion 210 that can effectively reduce the volume of the mold cavity 120, the saving of the amount of usage of cleaning compound can be achieved.

Figure 5:
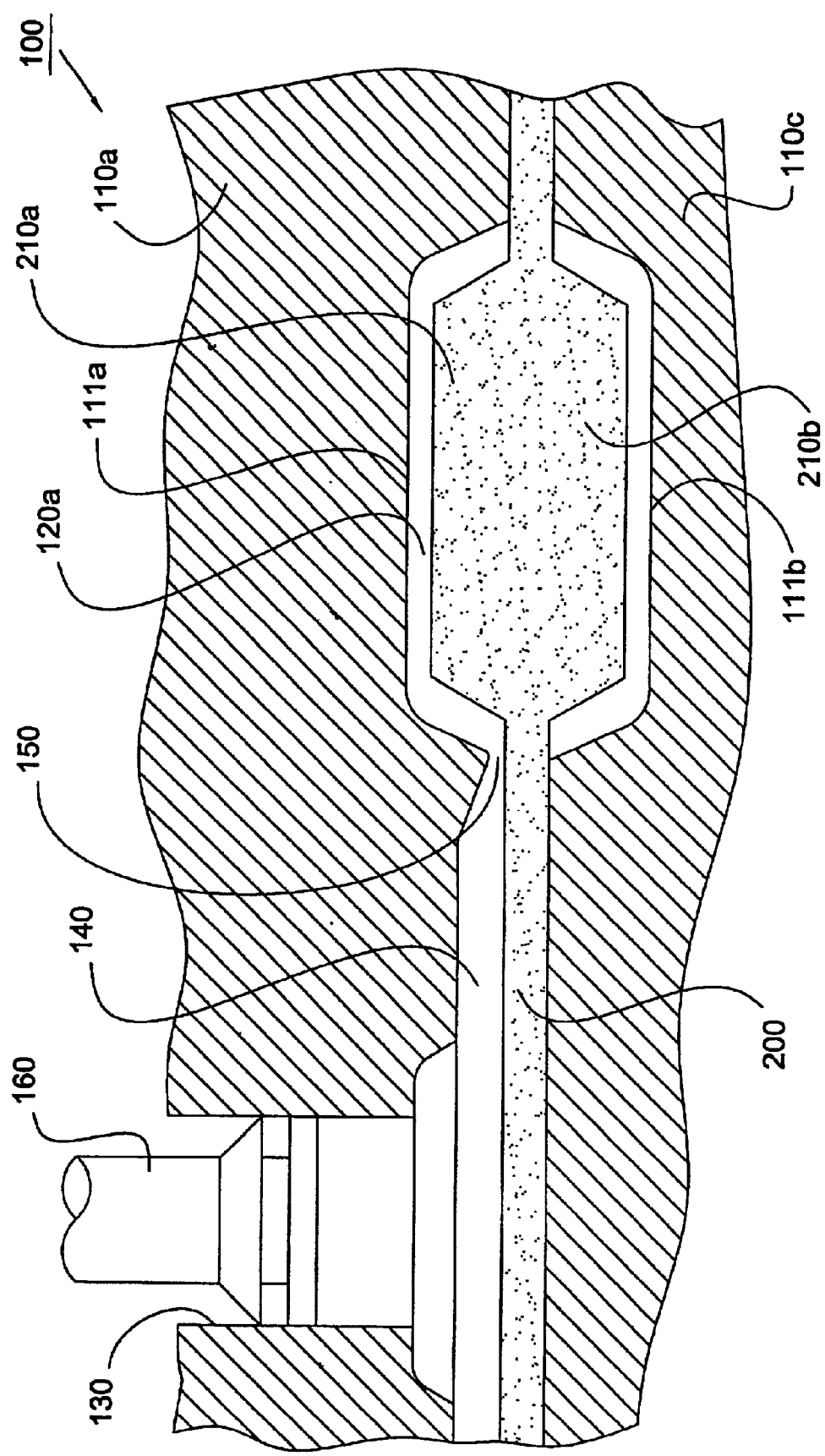
FIG. 5 is a partial cross-sectional view of a cleaning substrate for a mold according to another embodiment of the present invention.

FIG. 5 is a cleaning substrate for a mold according to another embodiment of the present invention. As shown in FIG. 5, the semiconductor mold 100 is applicable for making semiconductor devices having lead frame such as quad flat package (QFP), thin small outline package (TSOP) etc. The mold 100 includes an upper mold 110a having a plurality of first recesses 111a, and a lower mold 110b having a plurality of second recesses 111b. The upper mold 110a and the lower mold 110b are tightly compressed to close each other such that the first recess 111a and the second recess 111b are combined to form a mold cavity 120a. In addition, the mold 100 has a plurality of pots 130, a plurality of runners 140, and a plurality of gates 150 where each of the pots 130 are connected to each of the mold cavities 120 through each of the runners 140 and each of the gates 150 respectively.

As shown in FIG. 5, when cleaning the mold 100, the mold 100 is tightly clamped to have the cleaning substrate 200 containing in the mold cavities 120a. A plurality of first protrusions 210a and second protrusion 210b, both preferably made of paper, are provided on the top and the bottom surfaces of the cleaning substrate 200 respectively, and are integrally formed thereof respectively. Both of the protrusions 210a and 210b are substantially matched with and contained within the edges of each of the first recesses 111a and the second recesses 111b of the mold cavities 120a of the mold 100 respectively. Moreover, the profiles of each the first protrusions 210a and each of the second protrusion 210b are preferably corresponding to the edges of each of the first recesses 111a and the second recesses 111b of the cavities 120a respectively. Next a cleaning compound, such as a thermosetting melamine resin, is stored in the pots 130. The cleaning compound compressed by a downward pushing plunger 160 flows through the runner 140 and gate 150, and fills the mold cavities 120a, and also forms over the top surface of the cleaning substrate 200. After the cleaning compound is hardened to have the cleaning compound, the contaminated material layer, and the cleaning substrate 200 all integrally formed together to become a molding product, the mold 100 is opened to have the molding products taken out. In this way, the contaminated material layer is removed from the inner surface of the mold cavity 120a. Since the substrate 200 is provided with the protrusions 210a and 210b that can effectively reduce the volume of the mold cavity 120a, the saving of the amount of usage of cleaning compound can be achieved.

Although the present invention has been explained in relation to its preferred embodiments, it is to be understood that many other possible modifications and variations can be made without departing from the spirit and scope of the invention as hereinafter claimed.

What is claimed is:

1. In combination,
    a semiconductor packaging mold having at least one mold cavity for packaging semiconductor packages;
    a cleaning substrate for use in cleaning said semiconductor packaging mold, said substrate having at least a first protrusion on the upper surface thereof, said first protrusion being sized and shaped to be completely received within said mold cavity;
    wherein the first protrusion conforms in shave with said mold cavity; and
    wherein the substrate is made of paper.

2. The combination of claim 1, wherein
    the mold comprises at least an upper mold having at least a first recess, and a lower mold having at least a second recess, and the first recess and the second recess define said mold cavity when the upper mold and the lower mold are closed;
    the cleaning substrate further comprises at least a second protrusion on the lower surface of the substrate, the first protrusion is completely contained within the first recess of the upper mold and the second protrusion is completely contained within the second recess of the lower mold when the cleaning substrate is placed in the mold and the mold is closed.

3. The combination of claim 2, wherein the first and second protrusions conform in shape with said first and second recesses, respectively.

* * * * *